United States Patent Office 3,489,822
Patented Jan. 13, 1970

3,489,822
GRAFTED TERPOLYMER OF ETHYLENE, PROPYLENE AND A NON-CONJUGATED DIENE
Harry S. Witt, Naugatuck, Conn., and Charles F. Paddock, Wayne, N.J., assignors to Uniroyal, Inc., a corporation of New York
No Drawing. Original application Aug. 31, 1962, Ser. No. 220,875. Divided and this application Aug. 28, 1967, Ser. No. 663,493
Int. Cl. C08f $15/40, 19/18$
U.S. Cl. 260—878       11 Claims

ABSTRACT OF THE DISCLOSURE

Grafted terpolymers are made by interpolymerizing one or more ethylenic monomers, such as styrene and/or acrylonitrile, with a residually unsaturated terpolymer hydroperoxide. The terpolymer hydroperoxide is first made by hydroperoxidation of a terpolymer composed of ethylene, another aliphatic alpha-olefin, and a non-conjugated diolefin, in specified proportions. The grafted terpolymers are characterized by retention of high impact strength during outdoor exposure in sunlight.

---

This application is a division of copending application Ser. No. 220,875 of Harry S. Witt, filed Aug. 31, 1962.

This invention relates to hard, tough, rigid compositions known as gum plastics, comprising mixtures of a major proportion of a hard, relatively brittle polymer (resin), and a minor proportion of a relatively soft, rubbery polymer. Many such gum plastics are known, and a wide variety of useful products have been made from them. Their usefulness depends on the fact that they retain to a substantial degree the hardness and rigidity of the brittle resinous polymer, while showing a greatly increased resistance to failure under impact. The field of usefulness of prior art gum plastics has, however, been seriously restricted because in general they rapidly lose their impact resistance and become brittle when exposed to weathering in the outdoors atmosphere and sunlight, or under other similar conditions. The addition of materials which absorb ultraviolet light has been found ineffective in preventing this deterioration.

The compositions of the present invention are capable of providing articles that are greatly superior to those of the prior art in their resistance to deterioration, particularly to loss of impact strength, under prolonged exposure in the sunlight outdoors. This result is obtained by proper selection of the rubbery component of the gum plastic.

The rubbery component used in the compositions of the present invention is a graft copolymer made by polymerizing a resin-forming monomer (or a mixture of such monomers) in the presence of a rubbery copolymer resulting from the copolymerization of a monomer mixture comprising two or more alpha-monoolefins, with or without a minor proportion of diolefin. If a diolefin is used, the amount should be so limited that the rubbery copolymer has an iodine number not greater than about 20; this will generally correspond to not more than about 10% by weight of diolefin monomer units in the copolymer. The conditions of the graft polymerization must be such that a substantial part of the resin-forming monomer is attached to the rubber molecules, giving a true graft copolymer.

The alpha-monoolefins used in making thte rubbery copolymer are those having the formula $CH_2=CHR$, in which R may be hydrogen atom or a saturated alkyl radical, such as methyl, ethyl, n-propyl, iso-propyl, etc. Preferred rubbery copolymers are those in which the alpha-monoolefins used are ethylene and propylene, the weight ratio of ethylene monomer units to propylene monomer units in the copolymer being from 20/80 to 80/20, preferably between 35/65 and 65/35.

Diolefins suitable for use in making the rubbery copolymer are non-conjugated straight-chain or cyclic diene hydrocarbons which are copolymerizable with the alpha-monoolefins. Examples of suitable diolefins are straight or branched chain diolefins, such as those in which both double bonds are terminal as in 1,4-pentadiene, 1,5-hexadiene, 2 - methyl - 1,5-hexadiene, 3,3-dimethyl-1,5-hexadiene, 1,7-octadiene, 1,9-decadiene, 1,19-eicosadiene, and the like; diolefins in which only one double bond is terminal such as 1,4-hexadiene, 1,9-octadecadiene, 6-methyl-1,5-heptadiene, 7-methyl-1,6-octadiene, 11-ethyl-1,11-tridecadiene and the like. Also suitable are the bridged-ring diene hydrocarbons of similar nature containing 7 to 10 carbon atoms, especially those containing a methano or an ethano bridge, for example: (a) unsaturated derivatives of bicyclo [2,2,1] heptane containing at least two double bonds, including bicyclo [2,2,1] hepta-2,5-diene; dicyclopentadiene (also named $3a,4,7,7a$-tetrahydro-4,7-methanoindene), tricyclopentadiene, and tetracyclopentadiene; (b) unsaturated derivatives of bicyclo [2,2,2] octane containing at least two double bonds, including bicyclo [2,2,2] octa-2,5-diene; (c) unsaturated derivatives of bicyclo [3,2,1] octane containing at least two double bonds; (d) unsaturated derivatives of bicyclo [3,3,1] nonane containing at least two double bonds; (e) unsaturated derivatives of bicyclo [3,2,2] nonane containing at least two double bonds, and the like. Dicyclopentadiene and 1,4-hexadiene are preferred.

Methods for making these rubbery copolymers are well known, and need not be described here (see e.g., U.S. Patents 3,000,866; 3,000,867; 2,933,480).

Resins suitable for use in the invention include hard, rigid homopolymers and copolymers of olefinic monomers such as styrene, the halo-styrenes (e.g. para-chlorostyrene), alpha-methylstyrene, p-methylstyrene, acrylonitrile, methacrylonitrile, acrylic acid, methacrylic acid, the lower alkyl (1–8 carbon atoms) esters of acrylic and methacrylic acids, (e.g., methyl acrylate, methyl methacrylate), vinyl chloride, and many others. Resins of particular interest are polystyrene; polyvinyl chloride; polymethyl methacrylate; copolymers of styrene-acrylonitrile, of styrene-methyl methacrylate, of styrene-methacrylic acid; similar copolymers of alpha-methylstyrene; and copolymers of styrene-alpha-methylstyrene. These resins and methods for their prepartion are well known.

As stated above, the graft copolymer is made by polymerizing the resin-forming monomers in the presence of the rubbery ethylene-propylene copolymer, with the result that a substantial part of the newly-polymerized resin-forming monomer is attached to the rubber molecules. Any suitable conventional method for making such a graft copolymer may be used. For example, one method of graft polymerization (which is described in detail below) consists in first forming a peroxide or hydroperoxide of the rubber by heating a solution of the rubber in the presence of molecular oxygen and an organic peroxide or hydroperoxide, as described in British Patent 878,443. The treated rubber is then heated in the presence of the resin-forming monomers, which polymerize to give the graft copolymer. Other methods of making the graft copolymer may be used, for example, irradiation of the rubber with high-energy electromagnetic or particulate radiation (gamma rays, beta rays, etc.) and simultaneously or subsequently contacting the rubber with the resin-forming monomers; or subjecting the rubber to strong shearing action while in intimate contact with the monomer. The method of making the graft copolymer is not a critical factor in the invention, and any appropriate conventional method may be used.

The resin-forming monomers or mixtures of monomers suitable for use in making the graft copolymer are those mentioned above as suitable for making the resin. The resin-forming monomers used in making a graft copolymer for use with a given resin must be such as to give a graft copolymer which is miscible and compatible with the given resin. Frequently the monomers used for the graft are the same as those used to make the given resin, but this is not essential, as long as the resin and the graft copolymer are compatible, i.e., miscible to form a uniform, coherent mixture.

The proportion of resin-forming monomer to rubber used in the grafting reaction may vary over quite a wide range, depending upon factors such as the efficiency of grafting (i.e., the proportion of polymerized resin-forming monomer actually attached to the rubber), and the particular resin-graft copolymer system in question. In a good gum plastic the resin and the rubbery component must be miscible to form a uniform, coherent mixture; i.e. the two components must be compatible.

It is desired to emphasize that the advantages of the invention are not obtainable simply by blending the described resin with the ungrafted rubber itself, which in general is not compatible with the resin. While it is not desired to limit the invention to any particular theory of operation, it appears to be possible that the grafting of a portion of the resin onto the rubber, as described, renders the remaining resinous portion more compatible with the rubbery portion, so that a more uniform, coherent mixture is obtained. Whatever the explanation, the observed fact is that the present blend of resin with graft copolymer is remarkably superior to an otherwise similar blend of the resin with the ungrafted rubber. The proportion of resin-forming monomer to rubber used in the graft polymerization to achieve this result may vary in general from about 1:4 to about 4:1. Provided that there is enough monomer actually grafted onto the rubber to confer compatibility, this proportion is not critical. Proportions between 1:2 and 2:1 are usually satisfactory.

The relative amounts of resin and rubbery component in the compositions of the invention are best defined as the resin-to-rubber ratio, which is the ratio of the total amount of resinous material in the composition (i.e., resin added as such plus polymerized resinous monomer in the graft copolymer) to the amount of copolymer rubber (i.e., the rubbery spine or base polymer used in making the graft copolymer). Thus a mixture of 50 parts of resin with 50 parts of a graft copolymer of 25 parts of resin-forming monomer on 25 parts of rubber would have a resin-to-rubber ratio of 75:25. The resin-to-rubber ratio may vary from about 60:40 to about 95:5, depending upon the particular resin-graft polymer system in question, and upon the properties desired in the product. Increasing rubber content gives increasing impact strength, with some decrease in rigidity and hardness. For most purposes, the best rubber-to-resin ratio will be in the range 70:30 to 90:10.

The form of the invention in which the rubbery base or spine of the graft copolymer is an unsaturated polymer, that is, a copolymer which includes a minor proportion of combined diolefin along with the alpha-monoolefins, is especially preferred. Gum plastics comprising a blend of the described resin with a graft copolymer based on such unsaturated rubber are frequently outstanding in their ability to be bent without failing. Thus, a sample about 0.1 inch thick of preferred gum plastic of the invention containing graft copolymer made from such unsaturated rubber, can frequently be bent through an angle of up to 180° without appearing weak and "cheesy" or breaking at the bend, even when such bending is done by hand at a relatively slow rate.

The mixtures of resin and graft copolymer of the present invention are similar in properties to similar compositions of the prior art, and are useful in the many well-known applications of such compositions. In addition, they are capable of being made into articles that are greatly superior in their resistance to deterioration under outdoor aging. For this purpose there is added to the composition an efficient absorber of ultraviolet radiation in the wavelength band .280–.410 micron. Curiously enough, such ultraviolet absorbers give substantially no improvement in aging of the prior art compositions. Many such absorbers are known, for example, such commercially available materials used for this purpose as 2,(2'-hydroxy - 5 - methylphenyl)benzotriazole (Tinuvin P), 2,4-dihydroxy-benzophenone (Uvinul 400), 2,2'-dihydroxy-4,4'-dimethoxybenzophenone (Uvinul D–40), p-aminoazobenzene, hydroquinone, etc. Small amounts of these materials, about 0.05 to 5 parts by weight per 100 of the composition, give the desired protection.

One method of making the peroxidized rubber for use in the graft polymerization is illustrated by the following example. The rubber used was a terpolymer of ethylene, propylene, and dicyclopentadiene to which none of the antioxidant customarily used to preserve the rubber had been added. 125 g. of rubber was dissolved in a mixture of 3 liters of cumene and 150 ml. of ethanol. The temperature of the solution was brought to 65° C., 6 ml. of cumene hydroperoxide were added, and air was bubbled through the solution at 65° C. for 4 hours. The product was precipitated from the solution by slowly adding about 3 liters of methanol with gentle stirring; the resulting swollen mass was broken up into crumb form in a high-speed stirrer with knife blades, washed with methanol, and dried in a vacuum at 50° C.

A method for making the graft copolymer from the peroxidized rubber is illustrated by the following example. 50 grams of a peroxidized terpolymer rubber made as described in the preceding paragraph, 35 grams of styrene, 15 grams of acrylonitrile, and 60 grams of ethanol were mixed in a glass bottle; the bottle was stoppered, and the reaction mixture aws heated at 200° F. for 24 hours. The product was dried to constant weight in a vacuum oven. The yield was 96 grams of product, showing that 46 grams (92%) of the monomers were polymerized. Extraction of an aliquot of the product with methyl ethyl ketone gave a soluble fraction (ungrafted resin) corresponding to 35 grams of the total product; hence 11 grams of monomer were actually attached to the rubber by the graft polymerization.

The products of the invention, as illustrated in the examples given below, were tested to determine their properties. Tensile strength in pounds per square inch (p.s.i.), and percent elongation at break in tension, were determined by ASTM Method D638. Torsional modulus (p.s.i.) was determined by ASTM Method D1043, and was calculated as the apparent modulus of elasticity E, as described in the appendix to this method. Hardness was measured by ASTM Method D785, Method A, using the Rockwell R scale. Notched Izod impact (foot-pounds per inch of notch) was measured by ASTM Method D256. An acelerated test in the Weather-Ometer was used to simulate outdoor exposure; the samples were exposed to radiation from the carbon arc (without a filter) and to intermittent spraying with water substantially as described in ASTM Method D1499. Deterioration of impact strength by aging was determined using the procedure of ASTM Method D256, except that no notch was cut in the sample, the cross-sectional dimensions of the sample were 0.5 inch by 0.25 inch, and the impact was delivered against the wide face of the sample. This modified impact test is especially sensitive to deterioration in the aging procedure used.

The following examples illustrate the practice of the invention.

EXAMPLE I

In this example, a composition according to the invention (Experiments 1A and 1B) is compared with a typical composition according to the prior art (Experiments 1C and 1D). The compositions were made by mixing 50 parts by weight of a resin with 50 parts of a graft copolymer. The resin was in all cases a copolymer of 70% styrene and 30% acrylonitrile by weight. In 1C and 1D, the graft copolymer was the product of polymerizing a mixture of styrene and acrylonitrile (containing 70% by weight of styrene) in the presence of an equal weight of polybutadiene in latex form, using conventional emulsion polymerization methods. In 1A and 1B, the graft copolymer was the product of polymerizing a mixture of 70% styrene and 30% acrylonitrile in the presence of an equal weight of an ethylene-propylene-dicyclopentadiene terpolymer, using the peroxidized rubber technique described above. From infrared spectra, the rubber composition was estimated to be 46% ethylene, 49.6% propylene and 4.4% dicyclopentadiene by weight. The intrinsic viscosity of tetralin at 135° C. was 2.46; iodine number 8.9. The resin/rubber ratio (75/25) was the same in all experiments. Experiments B and D differed from A and C respectively only in that 2% of an ultraviolet light absorber (Tinuvin P, 2-(2'-hydroxy-5-methylphenyl)benzotriazole) was added in B and D.

Samples were molded from these compositions and tests were made with the results shown in the following table.

| Experiment No. | 1A | 1B | 1C | 1D |
|---|---|---|---|---|
| Formula: | | | | |
| Resin | 50 | 50 | 50 | 50 |
| Graft | 50 | 50 | 50 | 50 |
| Tinuvin P | | 2 | | 2 |
| Test results: | | | | |
| Notched Izod, R.T | 7.0 | 6.9 | 7.2 | 6.5 |
| Notched Izod, −20° F | 1.0 | 1.3 | 2.5 | 1.0 |
| Tors. mod.×10⁻³, R.T | 250 | 203 | 255 | 268 |
| Tors. mod.×10⁻³, 80° C | | 102 | 121 | 110 |
| Tensile strength | | 3,570 | 5,170 | 5,160 |
| Percent elongation | | 51 | 16.6 | 14.7 |
| Hardness (Rockwell R) | 89 | 84 | 98 | 98 |
| Impact strength after aging:[1] | | | | |
| 0 hours | 24.6 (NB) | 26.7 (NB) | 25.5 (NB) | 20.6 (NB) |
| 100 hours | 13 | 22.7 (NB) | 8.4 | 9.5 |
| 200 hours | 7.9 | 24.4 (NB) | 7.0 | 8.6 |
| 500 hours | 7.1 | 15 | 8.6 | 7.8 |

[1] Aged in the Weather-Ometer; impact strength by modified unnotched Izod method.
(NB) signifies that the sample did not break in the test.

This example shows that the compositions of the invention, when protected with an ultraviolet absorber, are far superior to similar prior art compositions in resistance to aging by ultraviolet light, and are substantially equal to them in other respects.

EXAMPLE II

This example illustrates compositions according to the invention using various styrene-acrylonitrile copolymer resins and graft copolymers, at different resin-to-rubber ratios. In each case, the resin and graft copolymer were mixed in such proportions as to give the desired resin/rubber ratio.

| Experiment No. | 2A | 2B | 2C |
|---|---|---|---|
| Percent styrene in resin | 90 | 70 | 70 |
| Rubber | (1) | (1) | (2) |
| Graft | (3) | (4) | (5) |
| Resin/rubber ratio | 72/25 | 80/20 | 80/20 |
| Test results: | | | |
| Notched Izod, R.T | 4.9 | 4.9 | 8.3 |
| Notched Izod, −20° F | | 0.7 | 1.2 |
| Tors. mod.×10⁻³ R.T | 240 | 296 | 333 |
| Tensile strength | 3,246 | 4,870 | |
| Hardness (Rockwell R) | 79 | 103 | 101 |

[1] Bipolymer of ethylene 56%, propylene 44%.
[2] Terpolymer of ethylene, propylene, and dicyclopentadiene; iodine No. 8.9.
[3] Graft of 36 styrene, 4 acrylonitrile, 40 rubber; 56% conversion.
[4] Graft of 35 styrene, 15 acrylonitrile, 50 rubber; 90% conversion.
[5] Graft of 35 styrene, 15 acrylonitrile, 50 rubber; 92% conversion.

EXAMPLE III

This example illustrates compositions of the invention using a styrene-alpha-methylstyrene copolymer resin (Styron 700), containing approximately 20–25% alpha-methylstyrene, and graft copolymers of styrene on various rubbers.

| Experiment No. | 3A | 3B | 3C | 3D |
|---|---|---|---|---|
| Rubber | (1) | (1) | (2) | (3) |
| Graft | (4) | (5) | (6) | (7) |
| Resin/rubber ratio | 75/25 | 80/20 | 80/20 | 80/20 |
| Test results: | | | | |
| Notched Izod, R.T | 6.4 | 3.7 | 5.9 | 5.9 |
| Notched Izod, −20° F | | 1.6 | 0.8 | 1.4 |
| Tors. mod.×10⁻³, R.T | 171 | 232 | 286 | 286 |
| Hardness (Rockwell R) | 50 | 79 | 91 | 86 |

[1] Ethylene-propylene bipolymer, 50% ethylene by weight.
[2] Ethylene-propylene bipolymer, 56% ethylene.
[3] Ethylene-propylene-dicyclopentadiene terpolymer; iodine No. 8.9.
[4] Graft of 80 styrene, 20 rubber; 57½% conversion.
[5] Graft of 80 styrene, 20 rubber; 100% conversion.
[6] Graft of 80 styrene, 20 rubber; 56% conversion.
[7] Graft of 50 styrene, 50 rubber; 97% conversion.

EXAMPLE IV

This example illustrates compositions of the invention using polyvinyl chloride and graft copolymers of styrene-methylmethacrylate on ethylene-propylene copolymer rubbers. The polyvinyl chloride was a commercial product, Geon 103 EP, having an intrinsic viscosity of 0.96 in cyclohexanone at 30° C.

| Experiment No. | 4A | 4B |
|---|---|---|
| Rubber | (1) | (2) |
| Graft | (3) | (4) |
| Resin/rubber ratio | 86/14 | 89/11 |
| Test results: | | |
| Notched Izod, R.T | 10.4 | 11.3 |
| Notched Izod, −20° F | 1.9 | 1.0 |
| Tors. mod.×10⁻³, R.T | 274 | 326 |
| Hardness (Rockwell R) | 99 | 106 |

[1] Ethylene-propylene bipolymer, 56% ethylene.
[2] Ethylene-propylene-dicyclopentadiene terpolymer; iodine No. 8.9.
[3] Graft of 24.7 styrene, 50.3 methyl methacrylate, 25 rubber; 100% conversion.
[4] Graft of 26.4 styrene, 53.6 methyl methacrylate, 20 rubber; 100% conversion.

EXAMPLE V

This example illustrates compositions of the invention using a styrene-methyl methacrylate copolymer resin, and graft copolymers of styrene-methyl methacrylate on ethylene-propylene copolymer rubber.

Experiment No. 5A:

| | |
|---|---|
| Percent styrene in resin | 33 |
| Rubber | (1) |
| Graft | (2) |
| Resin/rubber ratio | 80/20 |
| Test results— | |
| Notched Izod, R.T. | 2.8 |
| Notched Izod, −20° F. | 1.0 |
| Tors. mod.×10⁻³, R.T. | 280 |
| Hardness (Rockwell R) | 81 |

[1] Ethylene-propylene-dicyclopentadiene terpolymer; iodine No. 8.9.
[2] 16.5 styrene, 33.5 methyl methacrylate, 50 rubber; 97% conversion.

EXAMPLE VI

A graft copolymer was made by heating at 149° F. for 6½ hours a stirred mixture of 400 parts of water, 30 parts of ethylene-propylene-dicyclopentadiene terpolymer (iodine No. 8.9) in the form of a finely divided crumb, 49 parts of styrene, 21 parts of acrylonitrile, and 1 part of Alperox C (lauroyl peroxide). 92% of the monomers (64.4 parts) were converted to polymer, of which 13% (8.4 parts) were found by extraction with methyl ethyl ketone at 80° C. to be actually grafted to the rubber. 78 parts of the graft copolymer were mixed with 22 parts of a styrene-acrylonitrile copolymer resin containing 70% styrene. The mixture, which had a resin/rubber ratio of 75/25, gave the following test results.

| | |
|---|---|
| Notched Izod, R.T. | 6.1 |
| Notched Izod, −20° F. | 1.6 |
| Tors. mod.×10⁻³, R.T. | 186 |
| Hardness (Rockwell R) | 68 |

EXAMPLE VII

A graft copolymer was made by subjecting a mixture of rubber and monomer to high shear in an internal mixer [the Baker-Perkins Masticator; see Journal of Scientific Instruments, 31, 88–99 (1954)]. 10 grams of an ethylene-propylene bipolymer rubber (56% ethylene) were used. 2 grams of styrene were added at the start, and four more 2-gram portions at 20 minute intervals. The rotor speed was 72 r.p.m.; the temperature rose from 43° F. at the start to 133° F. at the end of the treatment (100 minutes). 8.4 grams of styrene were polymerized, of which 6.7 grams were actually attached to the rubber, as determined by extraction with methyl ethyl ketone at 80° C. A mixture of 33% of the graft copolymer with 67% of a styrene-alpha-methylstyrene copolymer resin (Styron 700), having a resin/rubber ratio of 80/20, gave the following test results.

| | |
|---|---|
| Notched Izod, R.T. | 3.0 |
| Notched Izod, −20° F. | 0.8 |
| Tors. mod. $\times 10^{-3}$, R.T. | 266 |
| Hardness (Rockwell R) | 88 |

The graft copolymer-resin blend of the invention may be mixed with other resins and/or rubbers, graft copolymers, ABS polymers (acrylonitrile-butadiene-styrene polymers), and the like. Thus, 30–97 parts of polyvinyl chloride resin may be admixed with 70–3 parts of a gum plastic of the invention (based, for example, on a blend of styrene-acrylonitrile resin with a graft copolymer of styrene and acrylonitrile on ethylene-propylene rubber). A small amount (e.g. 3–15 parts) of butadiene-acrylonitrile rubber, and/or graft copolymer of styrene and acrylonitrile on polybutadiene may also be included in the last-described mixture. The gum plastic of the invention may with advantage be added to blends of butadiene-acrylonitrile rubber with polyvinyl chloride resin.

The composition may be formed into sheets for vacuum forming (with or without lamination to other materials). Coated fabrics or unsupported films may be made from the composition. Compounded with a blowing agent, the described compositions may be expanded.

Having thus described our invention, what we claim and desire to protect by Letters Patent is:

1. A grafted terpolymer consisting of a terpolymer having side chains thereon and having been prepared from at least one ethylenically unsaturated free-radical polymerizable monomer grafted to a residually unsaturated terpolymer hydroperoxide, said terpolymer consisting of at least about 20% ethylene by weight, at least about 20% by weight of an at least $C_3$ aliphatic alpha olefin, and not over about 10% by weight of a non-conjugated diolefin.

2. The graft terpolymer of claim 1, wherein said non-conjugated diolefin has from 6 to 15 carbon atoms.

3. The graft terpolymer of claim 1, wherein said non-conjugated diolefin is selected from the group consisting of 1,4-hexadiene, and dicyclopentadiene.

4. A grafted terpolymer consisting of a terpolymer having said chains thereon and having been prepared from at least one ethylenically unsaturated free-radical polymerizable monomer grafted to a residually unsaturated terpolymer hydroperoxide, said terpolymer consisting of at least about 20% ethylene by weight, at least about 20% propylene by weight, and not over about 10% by weight of a diolefin selected from the group consisting of dicyclopentadiene and 1,4-hexadiene.

5. A grafted terpolymer consisting of a terpolymer having side chains thereon and having been prepared from at least one $C_2$ to $C_8$ ethylenically unsaturated free-radical polymerizable monomer grafted to a residually unsaturated terpolymer hydroperoxide, said terpolymer consisting of at least about 20% ethylene by weight, at least about 20% propylene by weight, and not over 10% by weight of diolefin selected from the group consisting of dicyclopentadiene, and 1,4-hexadiene.

6. The graft terpolymer of claim 5, wherein said free-radical polymerizable compound is about 20% to about 80% by weight of the total graft terpolymer.

7. The graft terpolymer of claim 5, wherein said graft monomer is selected from the group consisting of $C_4$ to $C_6$ unsaturated esters and $C_3$ to $C_4$ unsaturated nitriles.

8. The graft terpolymer of claim 5, wherein said graft monomers are methyl methacrylate and acrylonitrile.

9. A grafted terpolymer consisting of a terpolymer having side chains thereon and having been prepared from (a) at least one ethylenically unsaturated free-radical polymerizable monomer selected from the group consisting of styrene, chlorostyrene, alpha-methylstyrene, p-methyl styrene, acrylonitrile, methacrylonitrile, acrylic acid, methacrylic acid, lower alkyl esters of acrylic and methacrylic acid and vinyl chloride grafted to (b) a residually unsaturated terpolymer, said terpolymer consisting of at least about 20% ethylene by weight, at least about 20% by weight of an at least $C_3$ aliphatic alpha olefin, and not over about 10% by weight of a non-conjugated diolefin.

10. A grafted terpolymer as in claim 9, in which (b) is a terpolymer peroxide or hydroperoxide.

11. A grafted terpolymer as in claim 9 in which (a) is a mixture of styrene and acrylonitrile and (b) is an ethylene-propylene-non-conjugated diolefin terpolymer.

References Cited

UNITED STATES PATENTS

| | | | |
|---|---|---|---|
| 3,200,174 | 8/1965 | Adamek et al. | 260—889 |
| 3,236,917 | 2/1966 | Natta et al. | 260—878 |
| 3,271,477 | 9/1966 | Kresge | 260—877 |

MURRAY TILLMAN, Primary Examiner

M. J. TULLY, Assistant Examiner

U.S. Cl. X.R.

204—159.17; 260—2.5, 45.9, 45.95, 876, 877, 897